(12) United States Patent
Polton et al.

(10) Patent No.: US 12,505,124 B2
(45) Date of Patent: Dec. 23, 2025

(54) METHOD AND SYSTEM FOR CREATING A RULE FOR A BUSINESS FLOW DIAGRAM

(71) Applicant: JPMorgan Chase Bank, N.A., New York, NY (US)

(72) Inventors: Richard Polton, Bournemouth (GB); Henry Deards, Bournemouth (GB); Scott Edwards Coll, Bournemouth (GB); Tom Barber, Bournemouth (GB); Neil Sewell, Bournemouth (GB); Hayley Mackay, Bournemouth (GB); Sudarshan Vyas, Bournemouth (GB); Ryan Wills, Bournemouth (GB); Peter McQuillan, Bournemouth (GB); Tom Lancaster, Torpoint (GB); Robert Moeller, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 948 days.

(21) Appl. No.: 17/540,939

(22) Filed: Dec. 2, 2021

(65) Prior Publication Data

US 2023/0177109 A1 Jun. 8, 2023

(51) Int. Cl.
*G06F 16/28* (2019.01)
*G06F 17/18* (2006.01)
*G06N 5/02* (2023.01)
*G06Q 40/10* (2023.01)

(52) U.S. Cl.
CPC ............ *G06F 16/284* (2019.01); *G06F 17/18* (2013.01); *G06N 5/02* (2013.01); *G06Q 40/10* (2013.01)

(58) Field of Classification Search
CPC ......... G06F 17/18; G06F 16/284; G06N 5/02; G06Q 40/10
See application file for complete search history.

(56) References Cited

U.S. PATENT DOCUMENTS

| | | | |
|---|---|---|---|
| 2018/0203574 A1* | 7/2018 | Mital | G06F 16/26 |
| 2020/0387819 A1* | 12/2020 | Rogynskyy | G06N 20/00 |
| 2021/0065415 A1* | 3/2021 | Stetson | G06F 16/9024 |
| 2022/0335340 A1* | 10/2022 | Moustafa | G06N 20/00 |
| 2024/0281410 A1* | 8/2024 | Williams | G06F 16/16 |

* cited by examiner

*Primary Examiner* — Rehana Perveen
*Assistant Examiner* — John P Hocker
(74) *Attorney, Agent, or Firm* — Greenblum & Bernstein, P.L.C.

(57) ABSTRACT

Implementations generally relate to a decision graph. In some implementations, a method includes receiving a graph, where the graph includes data criteria. The method further includes receiving a data structure, where the data structure includes input values. The method further includes applying the data criteria of the graph against the input values of the data structure. The method further includes computing an output value based on the applying of the data criteria against the input values.

15 Claims, 5 Drawing Sheets

400

METHOD AND SYSTEM FOR CREATING A RULE FOR A BUSINESS FLOW DIAGRAM

BACKGROUND

Financial technology (Fintech) is an emerging industry that uses technology to improve activities in finance. For example, Fintech enables financial services to help business users in making business decisions based on known information and various requirements with regard to the information.

DETAILED DESCRIPTION

Implementations described herein enable, facilitate, and manage the utilization of a graph in a database environment. Fintech technology may be used to improve or augment various financial activities, such as providing financial information to customers. Providing financial information to both external customers and internal customers of a financial institution may involve the streamlining of various business processes. Such streamlining often involves a user manually filling out forms to make business decisions. Forms may help in organizing information. Filling out forms, however, is time consuming and tedious due to numerous criteria associated with data and other information. For example, a business may involve labor-intensive manual processes such as validation of documents. Such processes may be represented in the form of business flow diagrams. Business flow diagrams for many tasks may be framed as a mathematical graph including of a series of interconnected questions, which arrive at an eventual answer (e.g., a financial reporting requirement, etc.). As described in more detail herein, a system receives a graph representing a business process, models the graph, and utilizes the graph as well as reusing the graph to automate various processes.

As described in more detail herein, in various implementations, a system receives a graph, where the graph includes data criteria. The system also receives a data structure, where the data structure includes input values. As described in more detail herein, the system then applies the data criteria of the graph against the input values of the data structure. The system then computes an output value based on the applying of the data criteria against the input values. The system automatically without user intervention implements the graph to minimize or eliminate long, tedious, and manual processes associated with business decisions.

Figure 1:
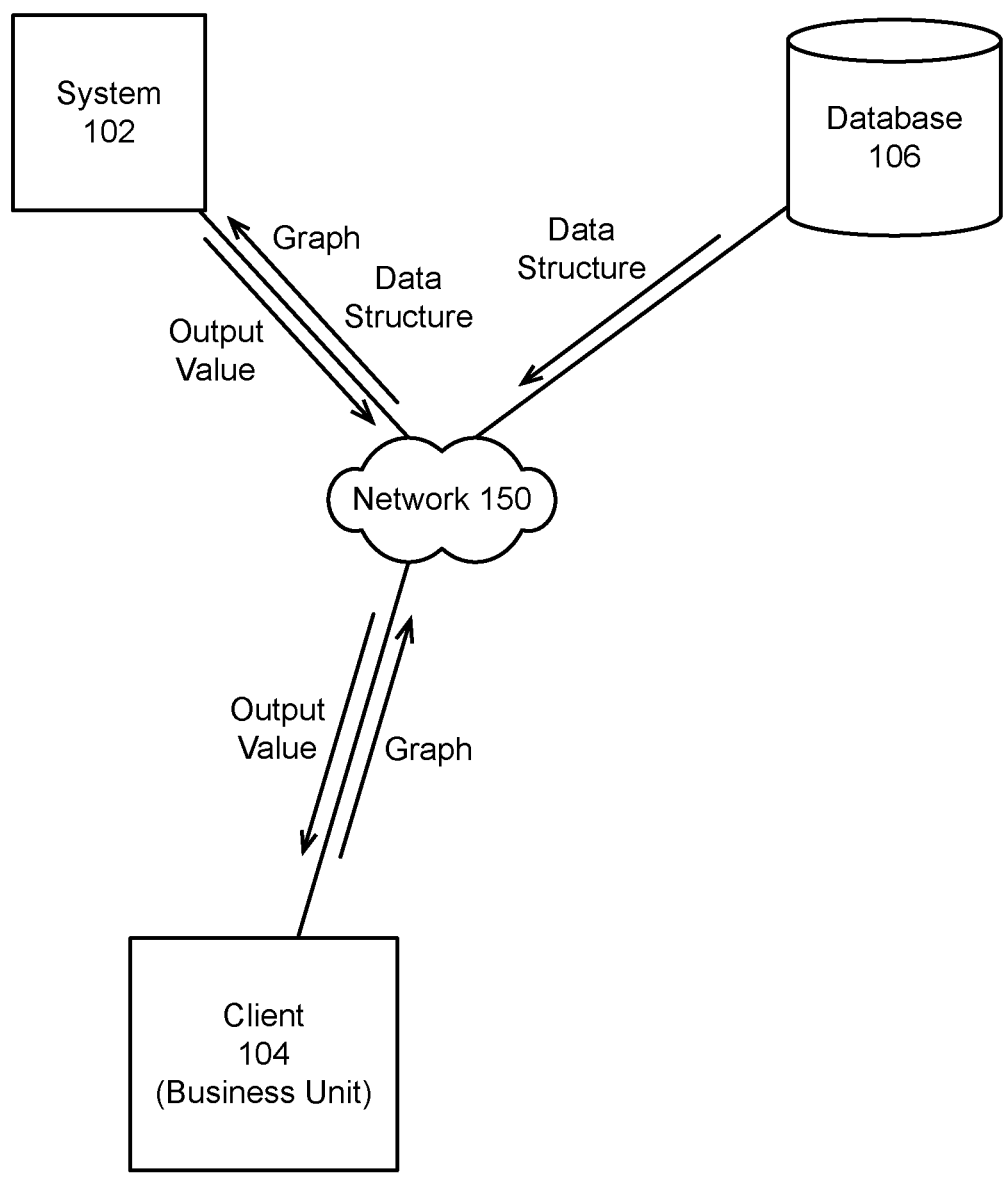
FIG. 1 is a block diagram of an example environment for utilizing a decision graph, which may be used for implementations described herein.

FIG. 1 is a block diagram of an example environment for utilizing a decision graph, which may be used for implementations described herein. As shown, environment 100 includes a system 102, a client device 104 or client 104, a database 106, and a network 150. Client 104 may be a client device used by a user in a business unit. Client device 104 may communicate with system 102 via network 150. Network 150 may include any suitable communication network such as a Wi-Fi network, Bluetooth network, the Internet, etc.

As described in more detail herein, in various implementations, system 102 receives a graph. Client 104 may be a client device used by a user in a business unit. In some implementations, the system 102 may receive the graph directly from a client device. System 102 may also receive the graph from a pool of graphs stored in database 106. The graph received from database 106 may be based on information such as a request from client 104.

In various implementations, the graph includes data criteria, and the data criteria may include a series of questions. These questions facilitate in determining one or more actions to be performed. In various implementations, the data criteria may include an ordered series of questions. These questions determine actions to be performed such as whether a form (e.g., a tax form) is required to be reported to a particular destination entity. Further examples directed to the graph and data criteria are described in more detail herein.

The system also receives a data structure, where the data structure includes input values. In various implementations, the input values may include raw data and metadata. These input values facilitate in determining one or more actions to be performed. For example, a tax form may include a question regarding a particular type of financial transaction, where the answer to the question determines whether the financial transaction and/or associated information (e.g., a monetary amount, parties to the transaction, etc.) needs to be reported to a destination entity such as a business entity, government entity, etc. Further examples directed to input values are described in more detail herein.

As described in more detail herein, the system applies data criteria from the graph against input values of the data structure. For example, the system may determine whether particular types of data or other information is present in the data structure. The system may also determine whether particular raw data satisfies any particular data criteria (e.g., whether a particular monetary amount meets a predetermined threshold, etc.).

The system then computes an output value based on the applying of the data criteria against the input values. Continuing with the tax form example above, the system may determine that the tax form needs to be reported to an internal business entity for review, based on the questions in the graph. The output value may be, for example, a conclusion that the form needs to be reported, etc. The system sends the output value to client device 104 for review and/or further action. Client device 104 may be associated with a business unit. A user or system associated with the business unit may in turn report the tax form or particular information associated with the tax form to a destination entity. The destination entity may be a business entity, a government entity, etc., for example. Further examples directed to the output value are described in more detail herein.

For ease of illustration, FIG. 1 shows one block for each of system 102, client device 104, and database 106. Blocks 102, 104, and 106, may each represent multiple respective systems, client devices, and databases. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
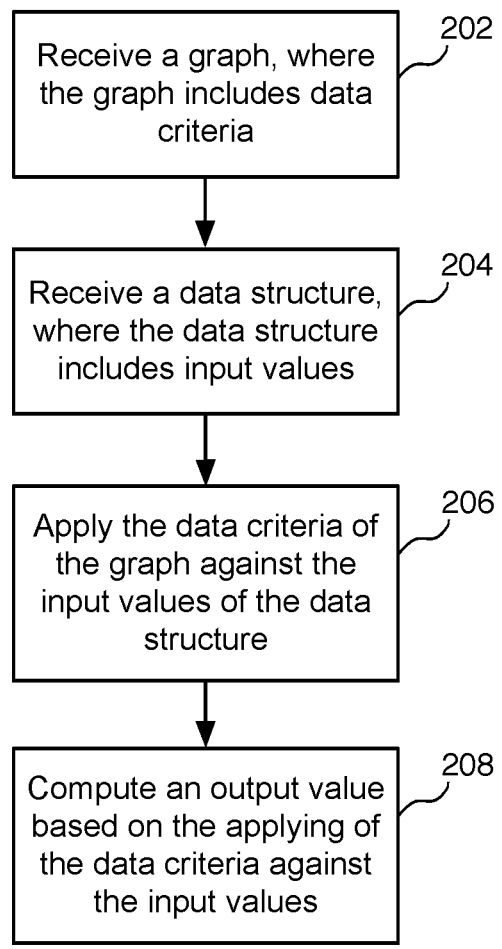
FIG. 2 is an example flow diagram for utilizing a decision graph, according to some implementations.

FIG. 2 is an example flow diagram for utilizing a decision graph, according to some implementations. Referring to both FIGS. 1 and 2, a method is initiated at block 202, where a system such as system 102 receives a graph. The graph may represent a process such as a business process (e.g., reporting procedures, etc.). The graph may be stored in a file or other suitable form. In various implementations, the graph includes data criteria. For example, the data criteria may include questions directed to whether data from a particular dataset or data structure is present, thereby satisfying one or more business requirements (e.g., tax reporting, etc.). Implementations directed to the graph are described in more detail below in connection with FIG. 3, for example.

At block 204, the system receives a data structure. In various implementations, the data structure may represent a form such as tax form. The data structure may include structured data such as objects with fields of data (e.g., JSON, XML, etc.). The data structure includes input values. In various implementations, the input values include raw data and metadata. The input values may include raw data associated with fields of a data structure. For example, the data structure may include fields such as form status, data or information, user name, department, etc. In various implementations, the input values also include metadata. For example, the metadata may include a status value of particular raw data. Implementations involving an example use case are described in more detail below in connection with FIG. 3, for example.

At block 206, the system applies the data criteria of the graph against the input values of the data structure. For example, the system may traverse the questions of the graph in order to determine whether criteria associated with at least some of the questions are satisfied. As the system reads the data structure, the system identifies relevant input values and ignores what is not needed. In various implementations, the system may utilize suitable natural language processing techniques and/or suitable domain specific language techniques to parse those input values.

In various implementations, the system accesses one or more libraries that enable the system to succinctly express in code a one-to-one representation that uses the same language of graphical business requirements. This direct correlation enables easier collaboration between development and operations as different teams can work in a shared domain specific language.

At block 208, the system computes an output value based on the applying of the data criteria against the input values. For example, the system may determine based on block 206 whether particular data or information needs to be reported. Example implementations involving these blocks of FIG. 2 are described in more detail below in connection with FIG. 3, for example.

Although the steps, operations, or computations may be presented in a specific order, the order may be changed in particular implementations. Other orderings of the steps are possible, depending on the particular embodiment. In some particular implementations, multiple steps shown as sequential in this specification may be performed at the same time. Also, some implementations may not have all of the steps shown and/or may have other steps instead of, or in addition to, those shown herein.

Figure 3:
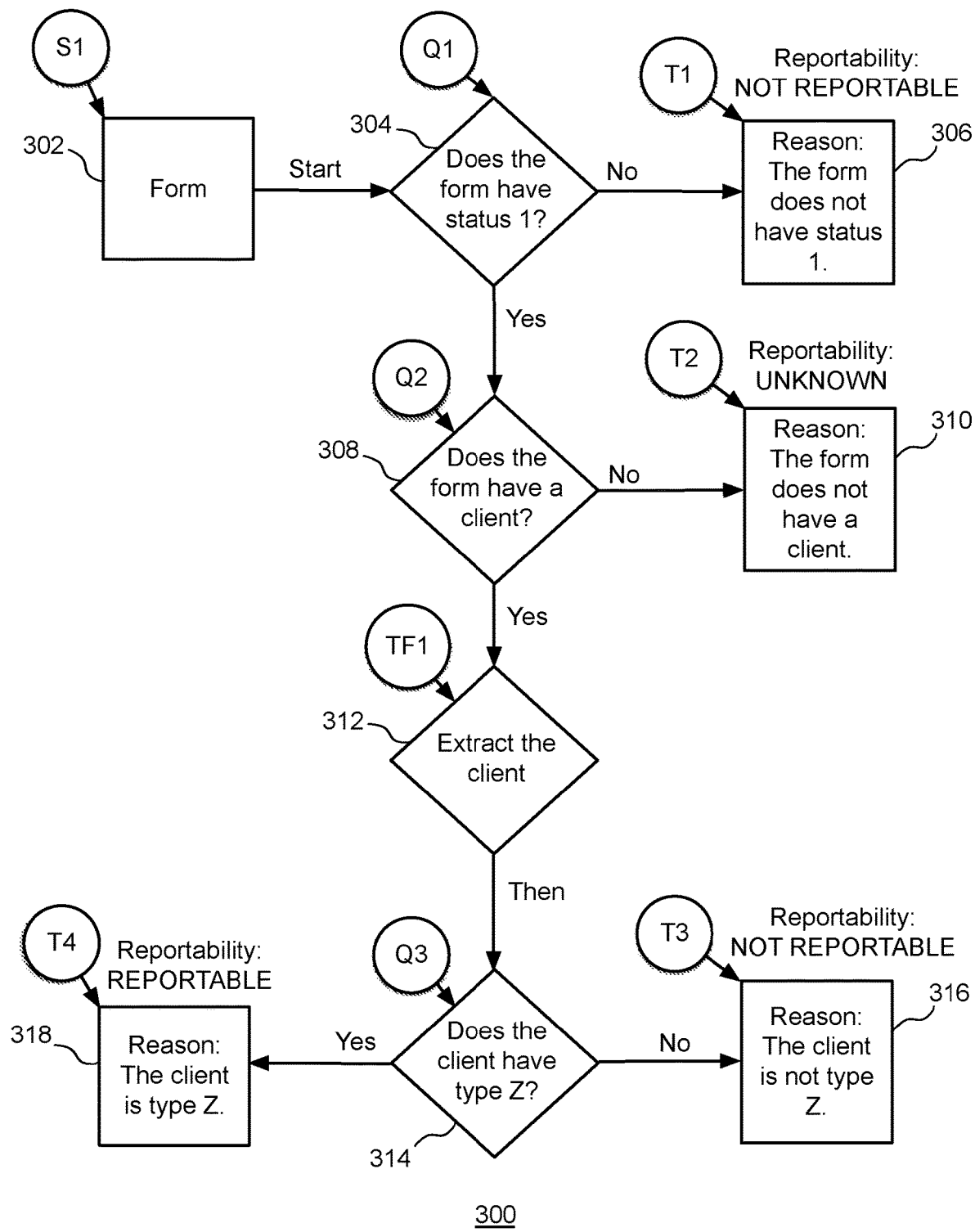
FIG. 3 is an example graph, according to some implementations.

FIG. 3 is an example graph 300, according to some implementations. As shown, in various implementations, graph 300 includes a variety of nodes 302 to 318. Each node may represent a component of a business process. The business process may include, for example, a series of questions used to determine whether a form such as a tax form needs to be reported. For ease of illustration, nine nodes are shown and described. An actual business process may involve hundreds of nodes representing various functions.

In various implementations, the term graph may refer to a file such as a graphical file or a representation of a mathematical graph composed of nodes. These nodes may perform various functions. For example, nodes may have functionality to ask questions, perform transformations, terminate returning an output value, etc. In various implementations, each of the nodes may be classified based on their node type or node functionality (e.g., start node, question node, transformation node, termination node, etc.).

In various implementations, the graph is mathematical. In various implementations, the graph is mathematical in the context of discrete mathematics. In some implementations, the graph is mathematical in that the connections between nodes go in a specific direction. As shown and described in connection with FIG. 3, for example, graph 300 may be a construct that includes vertices (nodes) connected by edges (connections).

As shown, the behaviour of each node, connections and dependencies between each node and other nodes are stored in graph 300. The behaviour of each node is extracted from its node contents. The system may perform such extractions using either suitable natural language processing techniques and/or domain specific language techniques. Each node's behaviour and connections to other nodes are captured and converted into code until the full graph has been modelled.

In this example implementation, graph 300 includes a start node 302 (also labeled S1), which is the starting node from which the system traverses graph 300. In various implementations, some nodes such as question nodes 304, 308, and 314 (also respectively labeled Q1, Q2, and Q3) are associated with the data criteria. In various implementations, the data criteria include questions. As shown in this example, in various implementations, graph 300 presents an ordered series of interconnected questions about various input values of a data structure in order to produce an output value (e.g., a required action, etc.). In various implementations, the system traverses question nodes 304, 308, and 314 in order to determine answers to the questions, the answers of which are determined from the data structure that is associated with the graph.

The following describes aspects of an example use case involving graph 300. In various implementations, the system generates a model of a given graph such as graph 300 at the first instance of the system processing the given graph. Generating the graph model enables the system to generate software code that contains the graph model and also enables the system to subsequently apply the graph model in the form of a graph against multiple different data structures. Based on the graph model, the system generates code to perform various functions in the graph. The system may store the graph model in any suitable data structure (e.g., XML, etc.).

In various implementations, the system traverses the nodes of graph 300 and records an accumulated working knowledge or understanding of graph 300 based on information compiled at each node of the parsing process. In various implementations, the accumulated working knowledge includes an input model, which includes raw data and metadata associated with input values of a data structure associated with graph 300.

In various implementations, the system traverses a graph to read an explicitly provided data structure including an input data model, which is integrated into the graph. Alternatively, in some implementations, the system may infer the structure of the input model and determine associated input values. For example, the system may scan through the graph to identify all of the fields of the input that are referenced by any of the graph nodes (e.g., question nodes, transformation nodes, etc.). The system may perform these identification functions using suitable natural language processing techniques and/or domain specific language techniques.

Referring still to FIG. 3, at start node 302 (S1), the system initiates a traversal process across graph 300. In various implementations, the system begins by parsing start node 302. The system determines that start node 302 is a start node and the entry point to graph 300. As shown, node 302 indicates that the data structure is associated with a form. For example, the form may be a tax form for determining whether the tax form should be reported to an entity such as a business entity, government entity, etc.

As indicated above, as the system traverses the nodes of graph 300, the system records an accumulated working knowledge or understanding of the graph. In this example implementation, node 302 is classified as a starting node. Starting node has a single outgoing connection (labeled Start) and no incoming connections. In this instance, the node has an input value of "Form" and has a node label "Form." In various implementations, the system makes an inference that the input value includes an input object called "Form," and that the system should start parsing the next node (e.g., question node 304).

In the following descriptions of the nodes, optional fields in the input models, output models, and rules are denoted with a question mark (e.g., "(?) Client," etc.). Field tabs may be used to show a hierarchy of some data items. In the rules sections, a "->" denotes an outgoing connection further into the graph and each rule's label refers back to the node it was derived from.

At this stage in the development of the model for graph 300, the system has a working accumulation of model information, referred to as Entry 1 and associated with node 302. Here, Entry 1 includes the following input model, output model, and rules:

Input Model:
    Form (newly added)
Output model:
    Unknown
Rules:
    S1- start with rule Q1 (newly added)

According to the rules associated with node 302, the system proceeds to parse question node 304 (Q1) of graph 300.

At node 304 (Q1), the system determines that the node is a question node and presents a particular question. In this example, the question is whether the form has a status value of 1.

In this example implementation, node 304 is classified as a question node, because its label ends in a question mark. This identification is verified by at least one incoming connection and two outgoing connections (e.g., one labeled "yes," the other labeled "no."). In this instance, the node has a node label ""Does the form have status 1?" In various implementations, the system makes an inference that the form data structure has a status field as it is referenced in the question. The system may also parse the question and evaluate Q1=s outgoing connections to create a logical rule that represents the node.

At this stage in the development of the model for graph 300, the system has a working knowledge, referred to as Entry 2 and associated with node 304. Here, Entry 2 includes the following input model, output model, and rules:

Input model:
    Form
        Status (newly added)
Output model:
    Unknown
Rules:
    S1- start with rule Q1
    Q1- if (form.status = 1) then -> Q2 otherwise -> T1 (newly added)

According to the rules associated with node 304, the system proceeds to parse question node 308 (Q2) if the form has an input value for status of 1. Otherwise, the system proceeds to termination node 306 (T1).

At node 306 (T1), the system determines that node 306 is a termination node. In this example implementation, graph 300 also includes termination nodes 306, 310, 316, and 318 (also labeled T1, T2, T3, and T4). Termination nodes 306, 310, and 316, and 318 provide respective answers or conclusions associated with respective questions 304, 308, and 314. The accumulated working knowledge also includes an output model, which includes one or more output values resulting from and based on the input values of the data structure associated with graph 300. In various implementations, the output model may include rules for processing the input parsed so far. In various implementations, the system traverses a graph to read an explicitly provided data structure including an output data model, which may be integrated into the graph. Alternatively, in some implementations, the system may infer the structure of the output model based on the output model being described by one or more of the terminating nodes. The system may also parse each of the steps taken to build up the output if that output value is accumulated over the course of a traversal.

In this example implementation, node 306 is classified as a terminating node, because it has one or more incoming connections and no outgoing connections. As such, the system may classify nodes in part based on their graphical elements. In this instance, the node has a node labeled "Reportability: NOT REPORTABLE" and "Reason: The input form does not have status 1." In various implementations, the system makes an inference that since this is the first terminating node that the system has encountered, the system learns the output model, including the object's structure. The output model is composed of a Reportability and a Reason. Termination node 306 contains no other information. In some implementations, the system is also able to create a logical rule which represents node 306.

At this stage in the development of the model for graph 300, the system has a working knowledge, referred to as Entry 3 and associated with node 306. Here, Entry 3 includes the following input model, output model, and rules:

Input model:
    Form

-continued

```
    Status
Output model:
    Reportability (newly added)
    Reason (newly added)
Rules:
    S1- start with rule Q1
    Q1- if (form.status = 1) then -> Q2 otherwise -> T1
    T1 - return { "Reportability" : "NOT REPORTABLE", "Reason" :
"The form does not have status 1."} (newly added)
```

According to the rules associated with starting node 306, the system outputs an output value, where reportability is "NOT REPORTABLE," and gives a reason that "The form does not have status 1." The process then ends, and the system stops traversing graph 300.

At node 308 (Q2), the system determines that node 308 is a question node and presents a particular question. In this example, the question is whether the form has a client. In this example implementation, node 308 is classified as another question node for the same reasons as question node 304 (Q1). Also the label of node 308 ends in a question mark. Node 308 has at least one incoming connection and two outgoing connections labelled "yes" and "no." In this instance, the node has a node label "Does the form have a client?" In various implementations, the system makes an inference that the form data structure has a client field as it is referenced in the question. This client field is optional as the question asks if the client is present (not what the client is).

At this stage in the development of the model for graph 300, the system has a working knowledge, referred to as Entry 4 and associated with node 308. Here, Entry 4 includes the following input model, output model, and rules.

```
Input model:
    Form
        Status
        (?) Client (newly added)
Output model:
    Reportability
    Reason
Rules:
    S1- start with rule Q1
    Q1- if (form.status = 1) then -> Q2 otherwise -> T1
    T1 - return { "Reportability" : "NOT REPORTABLE", "Reason" :
"The form does not have status 1."}
    Q2- if (form.client is present) then -> TF1 otherwise -> T2 (newly
added)
```

According to the rules associated with node 308, the system proceeds to parse transformation node 312 (TF1) if the form is associated with a client. Otherwise, the system proceeds to termination node 310 (T2).

At node 310 (T2), the system determines that node 310 is a termination node. In this example implementation, node 310 is classified as another terminating node, where the node 310 has one or more incoming connections and no outgoing connections. In this instance, node 310 has node labels "Reportability: UNKNOWN" and "Reason: The input form does not have a client." In various implementations, the system makes an inference that there is no new information about the graph model, and the system knows the output model of node 310.

At this stage in the development of the model for graph 300, the system has a working knowledge, referred to as Entry 5 and associated with node 310. Here, Entry 5 includes the following input model, output model, and rules:

```
Input model:
    Form
        Status
        (?) Client
Output model:
    Reportability
    Reason
Rules:
    S1- start with rule Q1
    Q1- if (form.status = 1) then -> Q2 otherwise -> T1
    T1 - return { "Reportability" : "NOT REPORTABLE", "Reason" :
"The form does not have status 1."}
    Q2- if (form.client is present) then -> TF1 otherwise -> T2
    T2 - return { "Reportability" : "UNKNOWN", "Reason" : "The form
does not have a client."} (newly added)
```

According to the rules associated with starting node 310, the system outputs an output value, where reportability is "UNKNOWN," and gives a reason that "The form does not have a client." The process then ends, and the system stops traversing graph 300.

In some implementations, graph 300 also includes a transformation node 312 (also labeled TF1). Transformation node 312 provides a transformation to be applied to data. For example, the system may fetch particular data based on the transformation node.

At node 312 (TF1), the system determines that node 312 is a transformation node. In this example implementation, node 312 is classified as a transformation node. The system can determine this, because the label of node 312 is an instruction rather than a question. Also, node 312 has at least one incoming connection and exactly one outgoing connection labelled then. Node 312 has a node label "Extract the client." In various implementations, the system makes an inference that going forward, the system will consider the client rather than the form, and future nodes will be related to the client as opposed to the form.

At this stage in the development of the model for graph 300, the system has a working knowledge, referred to as Entry 6 and associated with node 312. Here, Entry 6 includes the following input model, output model, and rules.

```
Input model:
    Form
        Status
        (?) Client
Output model:
    Reportability
    Reason
Rules:
    S1- start with rule Q1
    Q1- if (form.status = 1) then -> Q2 otherwise -> T1
    T1 - return { "Reportability" : "NOT REPORTABLE", "Reason" :
"The form does not have status 1."}
    Q2- if (form.client is present) then -> TF1 otherwise -> T2
    T2 - return { "Reportability" : "UNKNOWN", "Reason" : "The form
does not have a client."}
    TF1 - transform form to form.client -> Q3 (newly added)
```

According to the rules associated with node 312, extracts client information from the database and transforms the form to a form associated with the client. The system then proceeds to parse question node 314 (Q3).

At node 314 (Q3), the system determines that the node is a question node and presents a particular question. In this example, the question is whether the client has a type Z. In this example implementation, node 314 is classified as another question node, the label ends in a question mark, and has at least one incoming connection and two outgoing connections labeled "yes" and "no." Node 314 has a node labeled "Does the client have type Z?" In various implementations, the system makes an inference that the client data structure has a type field as it is referenced in the question.

At this stage in the development of the model for graph 300, the system has a working knowledge, referred to as Entry 7 and associated with node 314. Here, Entry 7 includes the following input model, output model, and rules:

---

Input model:
  Form
    Status
      (?) Client
        Type (newly added)
Output model:
  Reportability
  Reason
Rules:
  S1- start with rule Q1
  Q1- if (form.status = 1) then -> Q2 otherwise -> T1
  T1 - return { "Reportability" : "NOT REPORTABLE", "Reason" : "The form does not have status 1."}
  Q2- if (form.client is present) then -> TF1 otherwise -> T2
  T2 - return { "Reportability" : "UNKNOWN", "Reason" : "The form does not have a client."}
  TF1 - transform form to form.client -> Q3
  Q3- if (client.type = z) then -> T4 otherwise -> T3 (newly added)

---

According to the rules associated with node 314, the system proceeds to parse termination node 318 (T4) if the client is a type z. Otherwise, the system proceeds to termination node 316.

At node 316 (T3), the system determines that node 316 is a termination node.

In this example implementation, node 316 is classified as another terminating node, which has one or more incoming connections and no outgoing connections. Node 316 has a node labeled "Reportability: NOT REPORTABLE" and "Reason: The Client is not type z." In various implementations, the system makes an inference that there is no new information about the graph model, and the system knows the output model.

At this stage in the development of the model for graph 300, the system has a working knowledge, referred to as Entry 8 and associated with node 316. Here, Entry 8 includes the following input model, output model, and rules:

---

Input model:
  Form
    Status
      (?) Client
        Type
Output model:
  Reportability
  Reason
Rules:
  S1- start with rule Q1
  Q1- if (form.status = 1) then -> Q2 otherwise -> T1
  T1 - return { "Reportability" : "NOT REPORTABLE", "Reason" : "The form does not have status 1."}
  Q2- if (form.client is present) then -> TF1 otherwise -> T2
  T2 - return { "Reportability" : "UNKNOWN", "Reason" : "The form does not have a client."}
  TF1 - transform form to form.client -> Q3
  Q3- if (client.type = z) then -> T4 otherwise -> T3
  T3 - return { "Reportability" : "NOT REPORTABLE", "Reason" : "The client is not type Z."} (newly added)

---

According to the rules associated with starting node 316, the system outputs an output value, where reportability is "NOT REPORTABLE," and gives a reason that "client is not type Z." The process then ends, and the system stops traversing graph 300.

At node 318 (T4), the system determines that node 318 is a termination node. In this example implementation, termination node 318 is classified as another terminating node, as it has one incoming connection and no outgoing connections. Node has a node labels "Reportability: REPORTABLE" and "Reason: The Client is type z." In various implementations, the system makes an inference that there is no new information about the model, and the system knows the output model.

At this stage in the development of the model for graph 300, the system has a working knowledge, referred to as Entry 9 and associated with node 318. Here, Entry 9 includes the following input model, output model, and rules:

---

Input model:
  Form
    Status
      (?) Client
        Type
Output model:
  Reportability
  Reason
Rules:
  S1- start with rule Q1
  Q1- if (form.status = 1) then -> Q2 otherwise -> T1
  T1 - return { "Reportability" : "NOT REPORTABLE", "Reason" : "The form does not have status 1."
  Q2- if (form.client is present) then -> TF1 otherwise -> T2
  T2 - return { "Reportability" : "UNKNOWN", "Reason" : "The form does not have a client."}
  TF1 - transform form to form.client -> Q3
  Q3- if (client.type = z) then -> T4 otherwise -> T3
  T3 - return { "Reportability" : "NOT REPORTABLE", "Reason" : "The client is not type Z."}
  T4 - return { "Reportability" : "REPORTABLE", "Reason" : "The client is type Z."} (newly added)

---

According to the rules associated with starting node 318, the system outputs an output value, where reportability is "REPORTABLE," and gives a reason that "client is type Z." The process then ends, and the system stops traversing graph 300.

In various implementations, the system generates a model of the graph, as described above. The system may subsequently utilize the model of the graph as a separate reusable graph to apply against different data structures to produce corresponding output values. The system may receive one or more different data structures and then apply the model of the graph against input values of the one or more data structures. The system may then compute corresponding output values based on the applying of the model of the graph against the input values of the different data structures.

Implementations described herein provide various benefits. For example, the system automatically, without user intervention, implements the graph to eliminate or minimize long, tedious, and manual processes associated with business decisions.

Figure 4:
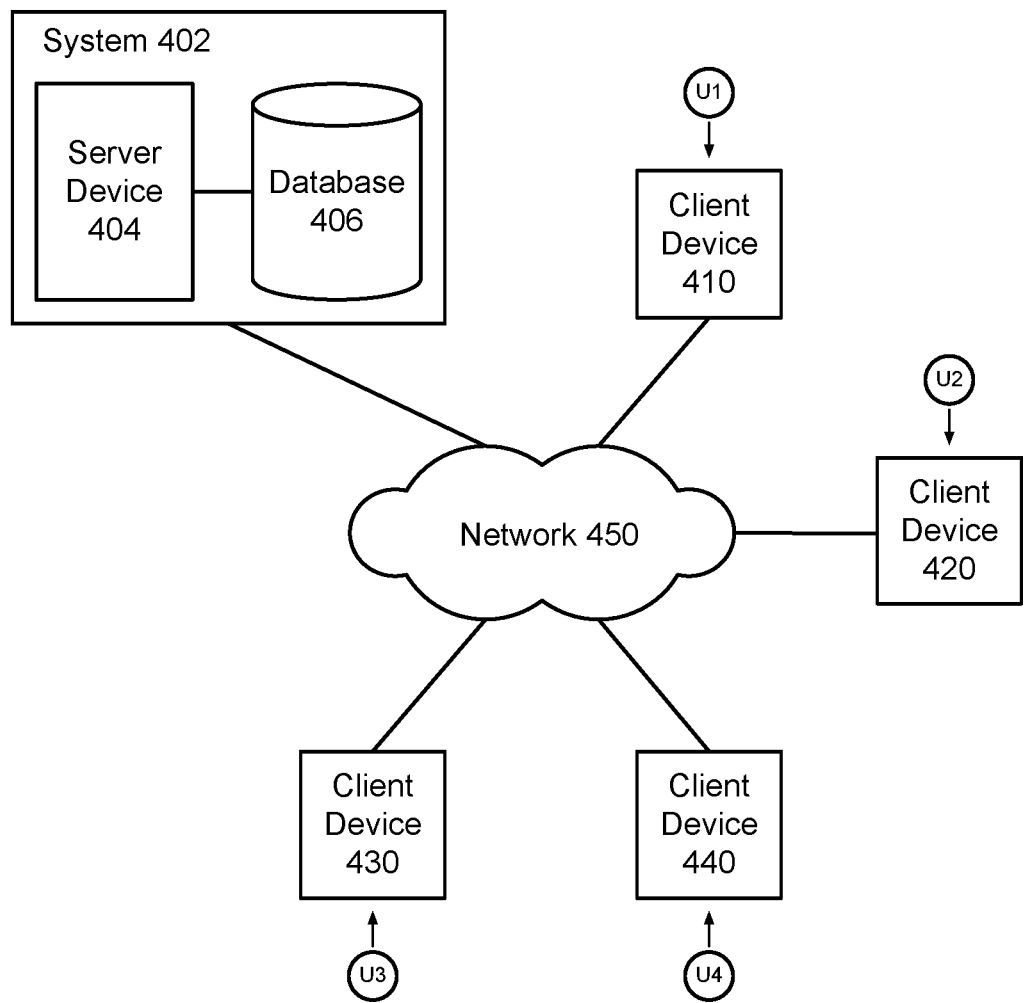
FIG. 4 is a block diagram of an example network environment, which may be used for implementations described herein.

FIG. 4 is a block diagram of an example network environment 400, which may be used for some implementations described herein. In some implementations, network environment 400 includes a system 402, which includes a server device 404 and a database 406. System 402 may be used to implement system 102 of FIG. 1, as well as to perform implementations described herein. For example, client devices 410, 420, 430, and 440 may represent different client devices that provide different graphs to the system. Client devices 410, 420, 430, and 440 may represent different client devices of the same business unit and/or of different business units. Network environment 400 also includes client devices 410, 420, 430, and 440, which may communicate with system 402 and/or may communicate with each other directly or via system 402. Network environment 400 also includes a network 450 through which system 402 and client devices 410, 420, 430, and 440 communicate. Network 450 may be any suitable communication network such as a Wi-Fi network, Bluetooth network, the Internet, etc.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server device 404 of system 402 performs implementations described herein, in other implementations, any suitable component or combination of components associated with system 402 or any suitable processor or processors associated with system 402 may facilitate performing the implementations described herein.

In the various implementations described herein, a processor of system 402 and/or a processor of any client device 410, 420, 430, and 440 cause the elements described herein (e.g., information, etc.) to be displayed in a user interface on one or more display screens.

Figure 5:
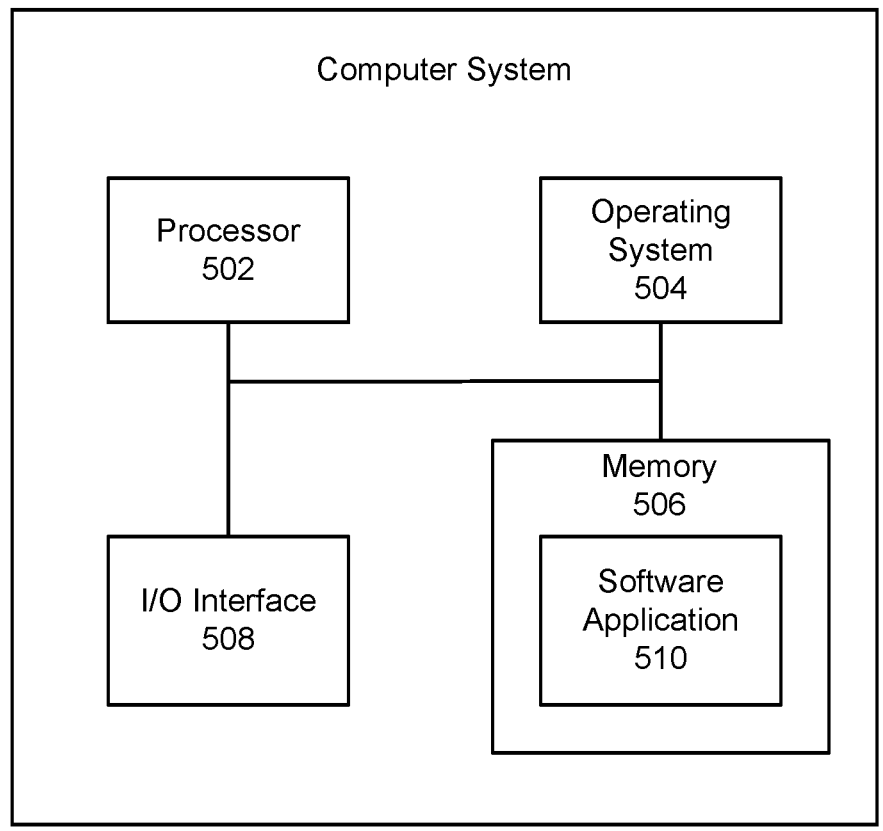
FIG. 5 is a block diagram of an example computer system, which may be used for implementations described herein.

FIG. 5 is a block diagram of an example computer system 500, which may be used for some implementations described herein. For example, computer system 500 may be used to implement server device 404 of FIG. 4 and/or system 102 of FIG. 1, as well as to perform implementations described herein. In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Computer system 500 also includes a software application 510, which may be stored on memory 506 or on any other suitable storage location or computer-readable medium. Software application 510 provides instructions that enable processor 502 to perform the implementations described herein and other functions. Software application 510 may also include an engine such as a network engine for performing various functions associated with one or more networks and network communications. The components of computer system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   one or more non-transitory computer-readable storage media storing logic for execution by the one or more processors and when executed operable to cause the one or more processors to perform operations comprising:
      receiving a file that relates to at least one procedure;
      generating a graph based on the received file, wherein the graph comprises data criteria, and
      wherein the graph comprises nodes that represent a rule of the at least one procedure, and wherein at least one of the nodes is associated with the data criteria;
      parsing the graph to identify at least one question;
      receiving a data structure, wherein the data structure comprises input values; determining at least one action to be performed in the at least one procedure, based on the at least one question and the data structure;
      identifying relevant input values from the data structure;
      parsing, via a natural language processing technique, the relevant input values;
      applying the data criteria of the graph against the parsed relevant input values of the data structure;
      computing an output value based on the applying of the data criteria against the parsed relevant input values;
      automatically generating, based on the computed output value, a decision that relates to the at least one action for completing the at least one procedure;
      performing the at least one action, based on the decision;
      extracting a node behavior from each node;
      identifying at least one connection between each node;
      converting the node behavior and the identified at least one connection into computer-based code;
      generating, based on a result of the converting, a model of the graph;
      generating software code containing the model of the graph;
      applying the model of the graph against a plurality of data structures;
      generating, based on the model of the graph, a second software code to perform at least one function in the graph;
      receiving a second data structure;
      applying the model of the graph against second input values of the second data structure; and
      computing a second output value based on the applying of the model of the graph against the second input values of the second data structure.

2. The system of claim 1, wherein the graph is mathematical.

3. The system of claim 1, wherein the data criteria comprise the at least one question.

4. The system of claim 1, wherein the input values comprise raw data and metadata.

5. The system of claim 1, wherein the input values comprise metadata, and wherein the metadata comprises a status value of raw data.

6. A non-transitory computer-readable storage medium with program instructions stored thereon, the program instructions when executed by one or more processors are operable to cause the one or more processors to perform operations comprising:
   receiving a file that relates to at least one procedure;
   generating a graph based on the received file, wherein the graph comprises data criteria, wherein the graph comprises nodes that represent a rule of the at least one procedure, and
   wherein at least one of the nodes is associated with the data criteria;
   parsing the graph to identify at least one question;
   receiving a data structure, wherein the data structure comprises input values;
   determining at least one action to be performed in the at least one procedure, based on the at least one question and the data structure;
   identifying relevant input values from the data structure;
   parsing, via a natural language processing technique, the relevant input values;
   applying the data criteria of the graph against the parsed relevant input values of the data structure;
   computing an output value based on the applying of the data criteria against the parsed relevant input values;
   automatically generating, based on the computed output value, a decision that relates to the at least one action for completing the at least one procedure;
   performing the at least one action, based on the decision;
   extracting a node behavior from each node;
   identifying at least one connection between each node;
   converting the node behavior and the identified at least one connection into computer-based code;
   generating, based on a result of the converting, a model of the graph;
   generating software code containing the model of the graph;
   applying the model of the graph against a plurality of data structures;
   generating, based on the model of the graph, a second software code to perform at least one function in the graph;
   receiving a second data structure;
   applying the model of the graph against second input values of the second data structure; and computing a second output value based on the applying of the model of the graph against the second input values of the second data structure.

7. The computer-readable storage medium of claim 6, wherein the graph is mathematical.

8. The computer-readable storage medium of claim 6, wherein the data criteria comprise the at least one question.

9. The computer-readable storage medium of claim 6, wherein the input values comprise raw data and metadata.

10. The computer-readable storage medium of claim 6, wherein the input values comprise metadata, and wherein the metadata comprises a status value of raw data.

11. A computer-implemented method comprising:
receiving a file that relates to at least one procedure;
generating a graph based on the received file, wherein the graph comprises data criteria, wherein the graph comprises nodes that represent a rule of the at least one procedure, and wherein at least one of the nodes is associated with the data criteria;
parsing the graph to identify at least one question;
receiving a data structure, wherein the data structure comprises input values;
determining at least one action to be performed in the at least one procedure, based on the at least one question and the data structure;
identifying relevant input values from the data structure;
parsing, via a natural language processing technique, the relevant input values;
applying the data criteria of the graph against the parsed relevant input values of the data structure;
computing an output value based on the applying of the data criteria against the parsed relevant input values;
automatically generating, based on the computed output value, a decision that relates to the at least one action for completing the at least one procedure;
performing the at least one action, based on the decision;
extracting a node behavior from each node;
identifying at least one connection between each node;
converting the node behavior and the identified at least one connection into computer-based code;
generating, based on a result of the converting, a model of the graph;
generating software code containing the model of the graph;
applying the model of the graph against a plurality of data structures;
generating, based on the model of the graph, a second software code to perform at least one function in the graph;
receiving a second data structure;
applying the model of the graph against second input values of the second data structure; and
computing a second output value based on the applying of the model of the graph against the second input values of the second data structure.

12. The method of claim 11, wherein the graph is mathematical.

13. The method of claim 11, wherein the data criteria comprise the at least one question.

14. The method of claim 11, wherein the input values comprise raw data and metadata.

15. The method of claim 11, wherein the input values comprise metadata, and wherein the metadata comprises a status value of raw data.

* * * * *